(12) United States Patent
Hoyos

(10) Patent No.: US 10,574,689 B1
(45) Date of Patent: Feb. 25, 2020

(54) MITIGATING MOBILE OS INTRUSIONS FROM USER SPACE APPLICATIONS USING SECURE SERVICES AND BIOMETRIC IDENTIFICATION

(71) Applicant: HOYOS VSN CORP., San Juan, PR (US)

(72) Inventor: Hector Hoyos, Ridgefield, CT (US)

( * ) Notice: Subject to any disclaimer, the term of this patent is extended or adjusted under 35 U.S.C. 154(b) by 26 days.

(21) Appl. No.: 15/696,254

(22) Filed: Sep. 6, 2017

Related U.S. Application Data

(60) Provisional application No. 62/496,151, filed on Oct. 6, 2016, provisional application No. 62/496,144, filed on Oct. 6, 2016, provisional application No. 62/496,154, filed on Oct. 6, 2016, provisional application No. 62/496,146, filed on Oct. 6, 2016, provisional application No. 62/496,143, filed on Oct. 6, 2016, provisional application No. 62/496,145, filed on Oct. 6, 2016, provisional application No. 62/496,152, filed on Oct. 6, 2016, provisional
(Continued)

(51) Int. Cl.
| | |
|---|---|
| *H04L 29/06* | (2006.01) |
| *G06F 21/53* | (2013.01) |
| *G06F 9/455* | (2018.01) |
| *H04W 12/06* | (2009.01) |
| *G06K 9/00* | (2006.01) |
| *G10L 17/00* | (2013.01) |
| *G10L 17/06* | (2013.01) |
| *G10L 17/22* | (2013.01) |

(52) U.S. Cl.
CPC ........ *H04L 63/145* (2013.01); *G06F 9/45558* (2013.01); *G06F 21/53* (2013.01); *H04L 63/0861* (2013.01); *H04L 63/1425* (2013.01); *H04L 63/1433* (2013.01); *H04W 12/06* (2013.01); *G06F 2009/4557* (2013.01); *G06K 9/00892* (2013.01); *G10L 17/005* (2013.01); *G10L 17/06* (2013.01); *G10L 17/22* (2013.01)

(58) Field of Classification Search
CPC .............. H04L 63/145; H04L 63/1425; H04L 63/0861; G06F 21/53
See application file for complete search history.

(56) References Cited

U.S. PATENT DOCUMENTS

| | | | |
|---|---|---|---|
| 8,949,929 B2 * | 2/2015 | Kelly | G06F 21/53 455/410 |
| 2010/0031325 A1 * | 2/2010 | Maigne | G06F 9/45533 726/4 |

* cited by examiner

*Primary Examiner* — Maung T Lwin
*Assistant Examiner* — Suman Debnath
(74) *Attorney, Agent, or Firm* — Brian K. Buchheit; Patents on Demand P.A.

(57) ABSTRACT

A method for mitigating intrusions to a mobile operating system (OS) that begins with the instantiation of secure services and corresponding data in secure service partitions by a secure multivisor running on a mobile device running a secure real-time operating system (RTOS). One of the secure services can be a biometric security service having corresponding biometric data defining a user's identity. The secure multivisor can instantiate a user space partition running a virtual machine with a guest OS having installed client software applications. When the virtual machine, a client software application, or a user requests interaction with the secure RTOS that meets a predefined privilege threshold, the biometric security service can determine the biometric identity of the user. When the determined biometric identity of the user matches a required biometric identity of the interaction, the biometric security service can allow the interaction with the secure RTOS.

19 Claims, 4 Drawing Sheets

Related U.S. Application Data application No. 62/496,150, filed on Oct. 6, 2016, provisional application No. 62/496,147, filed on Oct. 6, 2016, provisional application No. 62/496,153, filed on Oct. 6, 2016, provisional application No. 62/496,155, filed on Oct. 6, 2016.

MITIGATING MOBILE OS INTRUSIONS FROM USER SPACE APPLICATIONS USING SECURE SERVICES AND BIOMETRIC IDENTIFICATION

CROSS-REFERENCE TO RELATED APPLICATIONS

This Utility application converts and claims the benefit of U.S. Provisional Patent Application No. 62/496,151, filed Oct. 6, 2016, titled "Method for virtualized tactics threat intelligence service on a mobile device for secure policy enforcement"; Provisional Patent Application No. 62/496,144, filed Oct. 6, 2016, titled "Method for secure keyboard architecture to prevent pass1word theft"; Provisional Patent Application No. 62/496,154, filed Oct. 6, 2016, titled "Method for Multi-Modal Biometrically Secured Services on a Mobile Device"; Provisional Patent Application No. 62/496,146, filed Oct. 6, 2016, titled "Method for secure complete virtualized network management with application-level whitelist/blacklist"; Provisional Patent Application No. 62/496,143, filed Oct. 6, 2016; titled "SecureBiometrics-BasedMobileDevices and secure computing, electronics, networking, and communications equipment impervious to malware attacks"; Provisional Patent Application No. 62/496,145, filed Oct. 6, 2016, titled "Method for mobile OS virtualized with suite of secure services and a secure environment for execution of business logic on a mobile device"; Provisional Patent Application No. 62/496,152, filed Oct. 6, 2016, titled "Method for secure password/session manager to prevent password theft"; Provisional Patent Application No. 62/496,150, filed Oct. 6, 2016, titled "Method for multiple mobile OS's virtualized with suite of secure services and a secure environment"; Provisional Patent Application No. 62/496,147, filed Oct. 6, 2016, titled "Method for biometrically authenticated storage, communications and content sharing services"; Provisional Patent Application No. 62/496,153, filed Oct. 6, 2016, titled "Method for biometric and GeoFence secured access of applications and data"; Provisional Patent Application No. 62/496,155, filed Oct. 6, 2016, titled "Method for virtualized suite of services with dedicated hardware resources to provide a secure environment for execution of business". The entire contents of the above are incorporated by reference herein.

BACKGROUND

The present invention relates to the field of mobile device security, and more particularly to mitigating mobile OS intrusions from user space applications using secure services and biometric identification.

Mobile devices have become a convenient and integral part of daily life to the point that many consider them a necessity. Devices like smartphones are capable of providing a wide variety of communication, entertainment, and business functions. As such, a variety of personal and/or financial information is handled and/or stored by the many applications operating on mobile devices. The sensitive nature of this information raises concerns about the overall security afforded by the mobile device and its operating system (OS).

It is no question that the majority of mobile devices on the market today and their software, including the OS, were designed for consumers with the goal of maximizing convenience and usability. In recent years, the frequent discovery and/or exploitation of mobile device and/or OS security vulnerabilities has become the norm. Even though mobile devices and their OSes were not designed to enable secure computing, enterprises and consumers are demanding that security be of more importance.

The OS of the mobile device is the typical source of security vulnerabilities, whether inherent or installed from an external source, such as malware embedded within a client software application. As shown in FIG. 1, the basic internal communication architecture of a conventional mobile device 100 is comprised of its fundamental hardware 105, an OS 110, and a user space 115. The hardware 105 represents a variety of electronic components and circuitry. The OS 110 is a software application that manages the resources provided by the hardware 105 like CPU cycles and memory.

The user space 115 is an abstraction that represents the memory area where user software applications execute. The software applications of the user space 115 are directly installed by the user (i.e., applications the user purchases and downloads from an app store) or the manufacturer/seller of the mobile device 100 (i.e., the phone feature that is immediately available on a smartphone). Further, the user space 115 includes auxiliary applications like drivers or libraries that a software application needs to function.

In this conventional architecture, the OS 110 and user space 115 are both able to interact with the hardware 105. Thus, malicious software applications installed in the user space 115 are able to compromise the mobile device 100 directly as well as indirectly through the OS 110.

Therefore, what is needed is an approach that prevents potentially-malicious intrusions originating in the user space 115 from reaching the OS 110 and hardware 105. Such a solution would utilize biometric identification of the user to prevent unauthorized access and secure highly-sensitive features and data.

BRIEF SUMMARY

One aspect of the present invention can include a method for mitigating intrusions to a mobile operating system (OS) that begins with the instantiation of secure services and corresponding data in secure service partitions by a secure multivisor running on a mobile device. The mobile device can be running a secure real-time operating system (RTOS). Each secure service partition can be allocated a distinct set of dedicated appropriate hardware resources. The data can be stored in a secure service partition separate from its respective secure service. One of the secure services can be a biometric security service having corresponding biometric data defining a user's identity. The secure multivisor can then instantiate a user space partition running a virtual machine with a guest OS. Client software applications can be installed and operate from within the virtual machine. The user space partition can be allocated a distinct set of dedicated hardware resources. When the virtual machine, a client software application, or a user requests interaction with the secure RTOS that meets a predefined privilege threshold, the biometric security service can determine the biometric identity of the user. When the determined biometric identity of the user matches a required biometric identity of the interaction, the biometric security service can allow the interaction with the secure RTOS. When the determined biometric identity of the user fails to match the required biometric identity of the interaction, the biometric security service can reject the interaction with the secure RTOS, denying potentially-adverse interactions access to the secure RTOS.

Another aspect of the present invention can include a mobile device comprised of hardware components, a secure real-time operating system (RTOS), a secure multivisor, a virtual machine, biometric data, and a biometric security service. The hardware components can at least include a processor system, a persistent non-transitory storage medium, input/output (I/O) components, and a transceiver. The secure RTOS can manage system resources represented by the hardware components. The secure multivisor can be configured to provide a virtualization infrastructure comprised of secure service partitions and user space partitions. Each partition can be allocated a distinct set of dedicated system resources. The virtual machine can run a guest operating system (OS) within a user space partition. Client software applications can be installed and operate from within the virtual machine. The biometric data can define a user's identity and can be stored within a first secure service partition. The biometric security service can operate within a second secure service partition and can be configured to control interaction with the secure RTOS by the virtual machine, a client software application, or the user based upon biometric verification of the user's identity using the biometric data and applicable hardware components. The interaction can meet a predefined privilege threshold. The biometric security service can deny potentially-adverse interactions access to the secure RTOS.

A number of mobile device, which use an Advanced RISC Machine (ARM) architecture processor, utilize a TRUST-ZONE approach to hardware separate secure and non-secure software portions. With a conventional TRUSTZONE device devices exist that control microphones, processors, power management, wireless transceivers, and the like. These drivers increase the attack surface in that vulnerability packages exist for a TRUSTZONE that attack vulnerabilities, which in turn attacks the device. Effectively, a TRUST-ZONE is turned into an attack surface. A conventional TRUSTZONE gives priority an operating system, such as the ANDROID OS, (the guest OS) over a secure underlying operating system (e.g. Integrity OS), above which the virtual machines run. Embodiments of the disclosure clean up the TRUSTZONE so that when Integrity OS is loaded as a multivisor, the TRUSTZONE gives priority to the underlying Integrity OS (and not the Guest OS; e.g., ANDROID OS). This ensures that an attack package on the TRUST-ZONE does not open up an attack surface exposing a TRUSTZONE specific vulnerability. Thus, cleaning up the TRUSTZONE and ensuring attack packages that conventionally permit GuestOS vulnerabilities to be exploited is critical in ARM based embodiments of the invention. As used here, a TRUSTZONE approach attempts to block non-secure software from accessing resources directly. A TRUSTZONE uses software referred to as the secure monitor (Cortex-A) or by the core logic (Cortex-M). This concept of secure (trusted) and non-secure (non-trusted) worlds extends beyond the processor to encompass memory, software, bus transactions, interrupts and peripherals within an SoC. The disclosure takes this concept a set further, by relying not on GuestOS software separations but by relying on the underlying secure OS, over which the GuestOS is a virtual machine.

Yet another aspect of the present invention can include a computer program product that includes a computer readable storage medium having embedded computer usable program code. The computer usable program code can be configured to receive a request for interaction with a secure real-time operating system (RTOS) operating on a mobile device. The interaction can originates from a user, a client software application operating from a virtual machine that is running in a user space partition, or a secure service running in a secure service partition. The computer usable program code can be configured to assess a privilege level of the received interaction. The privilege level can define what features of the secure RTOS are accessible and whether biometric verification is required. The computer usable program code can be configured to, when the assessed privilege level requires biometric verification, determine a biometric identity of the user using previously-stored biometric data defining the user's identity. The computer usable program code can be configured to, when the determined biometric identity of the user matches the required biometric identity of the interaction, allow execution of the interaction with the secure RTOS. The computer usable program code can be configured to, when the determined biometric identity of the user fails to match the required biometric identity of the interaction, reject execution of the interaction with the secure RTOS, denying potentially-adverse interactions access to the secure RTOS.

DETAILED DESCRIPTION

Figure 1:
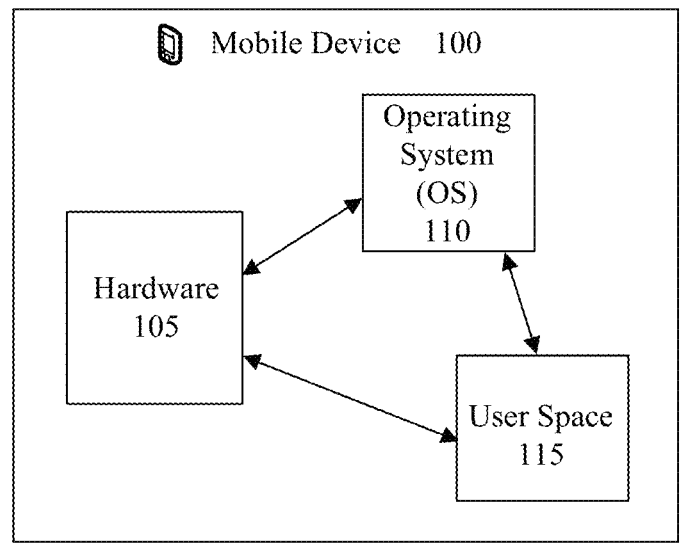
FIG. 1 (PRIOR ART) illustrates the basic internal communication architecture of a conventional mobile device in accordance with embodiments of the inventive arrangements disclosed herein.

Embodiments of the disclosed invention can present a solution for improving mobile device security against user space application intrusions using secure services and biometric identification. A secure real-time operating system (RTOS), its complementary multivisor, and a set of secure services can be installed upon a mobile device. The multivisor can run the set of secure services in designated secure service partitions and guest operating systems (OSes) within virtual machines (VMs) in separate user space partitions. All partitions can have dedicated hardware resources. The set of secure services can include a biometric security service to enforce biometric identity verification of the user in order for specific features, data, and/or applications to be accessed. Compromises and/or failures caused by vulnerabilities of the guest OS and/or client software applications running within the VM can be unable to affect other user space partitions, the secure service partitions, and the secure RTOS.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
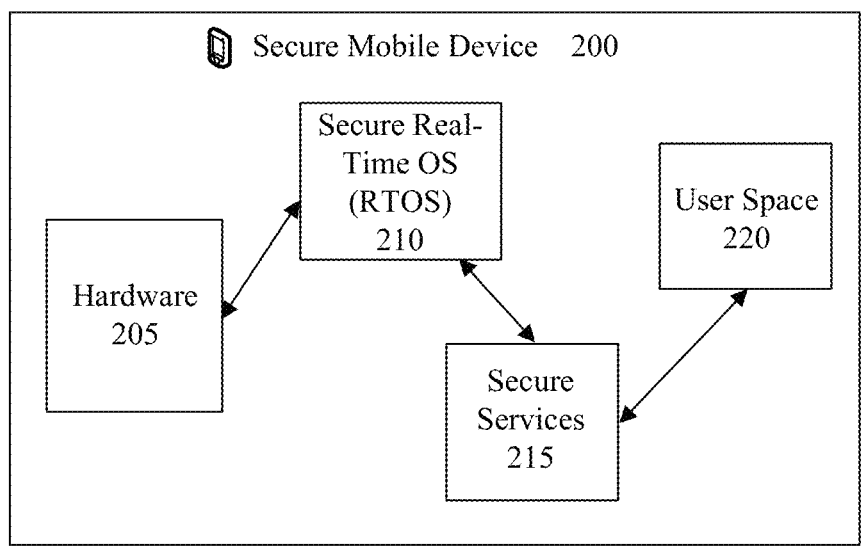
FIG. 2 illustrates the basic internal communication architecture of a secure mobile device in accordance with embodiments of the inventive arrangements disclosed herein.

FIG. 2 illustrates the basic internal communication architecture of a secure mobile device 200 in accordance with embodiments of the inventive arrangements disclosed herein. The secure mobile device 200 can be comprised of hardware 205, a secure real-time OS (RTOS) 210, a set of secure services 215, and a user space 220.

Unlike mobile device 100 of FIG. 1, communications from the user space 220 to the secure RTOS 210 or hardware 205 can be required to be assessed by the set of secure services 215. The set of secure services 215 can determine if the interaction with the secure RTOS 210 or hardware 205 requested by the user space 220 is potentially-detrimental. Further, depending on the level of privilege associated with the requested interaction, the secure services 220 can require biometric verification of the user's identity.

For example, the user can attempt to access session management functions for the secure mobile device 200. The information handled by these functions can be sensitive and should be accessed by only the user. Therefore, the secure services 215 can request immediate biometric verification before allowing access.

By eliminating the ability for software applications installed within the user space 220 to freely interact with the secure RTOS 210 and hardware 205, the overall security of the secure mobile device 200 can be improved without requiring additional hardware or redesigning the user space 220. In embodiments, the secure RTOS 210 is the only operating system with which consumers interact. Other embodiments enable Guest OS(s) to run on top of the RTOS 210. This provides advantages of being able to load and utilize applications running in the Guest OS(s) without the disadvantages of such applications opening up vulnerabilities on the underlying operating system (RTOS 210).

Figure 3:
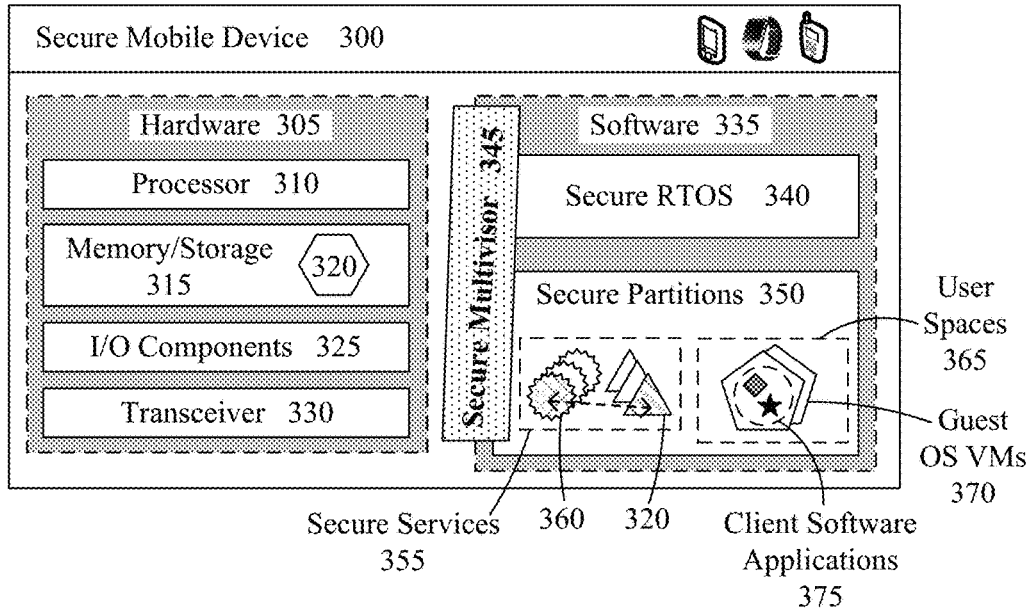
FIG. 3 is a schematic diagram of a secure mobile device that utilizes secure services having a biometric security service in accordance with embodiments of the inventive arrangements disclosed herein.

FIG. 3 is a schematic diagram of a secure mobile device 300 that utilizes secure services 355 having a biometric security service 360 in accordance with embodiments of the inventive arrangements disclosed herein. The secure mobile device 300 can support the architecture described in FIG. 2.

The secure mobile device 300 can be comprised of hardware 305 and software 335 components. The hardware 305 can include one or more processors 310, memory and storage 315, input/output (I/O) components 325, a transceiver 330, and the like.

A processor 310 can refer to a central processor unit (CPU) that executes the machine-readable instructions of software 335 by performing arithmetical, logical, and input/output operations. Multiple processor 310 components can be used to increase computing power and distribute load. Further, specialized or dedicated processors 310 or processor 310 areas can be used to handle specific functions, such as a secure area of a main processor 310 for creating a Trusted Execution Environment (TEE).

The memory/storage 315 can be used to store the machine-readable instructions of software 335. Memory/storage 315 can include volatile and non-volatile elements as well as non-transitory and removable media.

The I/O components 325 can represent a variety of means for receiving input data and presenting output data. Examples of I/O components 325 can include, but are not limited to, a microphone, a speaker, a display, a keyboard, a touchscreen, a digital camera, sensors, and the like. The I/O components 325 included in the secure mobile device 300 can support the functions of the software 335 and/or secure services. For example, the biometric security service 360 can utilize facial recognition as a means of biometric identify verification. Therefore, the I/O components 325 can be required to include a camera to take the user's picture and facial recognition software 335 to process the image.

The transceiver 330 can be a component able to wirelessly transmit and receive data. Multiple transceivers 330 can be included in the secure mobile device 300 to allow multiple means of connectivity. In such an embodiment, the secure mobile device 300 can be configured to utilize available communications networks in accordance with predefined rules and/or user-configured preferences.

The software 335 components of the secure mobile device 300 can represent the machine-readable instructions that are stored in the memory/storage 315 and cause the secure mobile device 300 to perform various tasks when executed by the processor 310. The primary software 335 components can include a secure real-time operating system (RTOS) 340, a secure multivisor 345, and secure partitions 350.

The secure RTOS 340 can represent the system program that manages the resources, hardware 305 and software 335, of the secure mobile device 300 and provides common services for the secure multivisor 345 and secure partitions 350. To increase the overall security, the RTOS 340 can be the INTEGRITY RTOS, which is well known for its high-level of security and reliability.

The secure multivisor 345 can represent the hardware and/or software components necessary to create and manage virtualizations, the secure partitions 350, like the INTEGRITY MULTIVISOR. In the Art, other terms for the secure multivisor 345 can be hypervisor or virtual machine monitor (VMM). The secure partitions 350 can be virtual containers that separate functions and/or data. Each secure partition 350 can have its own set of dedicated hardware 305 resources; this hardware 305 separation can be enforced by the secure multivisor 345.

The secure partitions 350 can be used to host secure services 355, including their corresponding critical data, and user spaces 365. The secure services 355 can represent core features and value-added services that improve and support security. Examples of secure services 355 can include, but are not limited to, a secure keyboard, a session manager, firewall and/or proxy services, encryption services, a password manager, threat analysis, intrusion detection, a golden image service, a content storage service, and the like.

A biometric security service 360 can be a secure service 355 that utilizes the necessary I/O components 325 to capture biometric data for the user and verify the captured data against stored biometric data 320 that defines the user's biometric identity. The biometric security service 360 can utilize the Biometric Open Protocol Standard (BOPS) as maintained by the Institute of Electrical and Electronics Engineers (IEEE) like IEEE2410.

The data 320 for the user's biometric identity can be stored in a secure partition 350 separate from the biometric security service 360, protecting this critical data 320 from unauthorized access from other secure partitions 350 (access to the secure partition 350 housing the biometric identity data 320 can be enforced by the secure multivisor 345). The secure partition 350 housing the biometric identity data 320 can correspond to an area of the secure mobile device's 300 memory/storage 315.

The biometrics captured by the biometric security service 360 and used to define the user's biometric identity data 320 can include, but are not limited to, a near-infrared (NIR) iris scan, a fingerprint, handprint, or a combination thereof, a DNA profile, facial recognition, voice recognition, and the like. The biometrics used by the biometric security service 360 can require the secure mobile device 300 to include additional and/or specific I/O components 325. For example, a backside camera that is not limited to use of a single fingerprint, but can concurrent take a set of one or more images of multiple prints (and the hand size, palm markings, etc.) to provide a significantly more secure biometric than use of a single fingerprint alone, as is common with conventional mobile device scanners.

The biometric security service 360 can be used to safeguard access to other secure services 355, data, client software applications 375, the secure multivisor 345, secure RTOS 340 functions, hardware 305 components, and/or the secure mobile device 300 as a whole. Different levels of biometric identify verification can be required to access different items. For example, accessing a locked secure mobile device 300 can require fingerprint (or multi-fingerprint from a single scan) verification, while updating biometric identity data 320 can require fingerprint verification and facial recognition.

In another contemplated embodiment, the biometric security service 360 can be used to secure access to files stored in the memory/storage 315 of the secure mobile device 300. These files can be system files and/or files generated by client software applications 375.

In another embodiment, the biometric security service 360 can be used to secure communication functions (e.g., voice chat, text chat, video chat, etc.) of a client software application 375 (e.g., SKYPE, FACEBOOK, INSTAGRAM, SNAPCHAT, etc.) or the base communication functions (e.g., voice communication, text messaging, video conferencing, etc.) of the secure mobile device 300. For example, placing a phone call can require the user to pass voice recognition, allowing only the user of the secure mobile device 300 to make calls.

In yet another contemplated embodiment, the biometric security service 360 can incorporate user-group level rules. For example, the secure mobile device 300 can be a shared resource among a team of users. The biometric security service 360 can restrict access to only this group. Additional granularity of access privileges within the group can also be supported.

In still another embodiment, the biometric security service 360 can work in conjunction with a location service (e.g., GPS, RF Triangulation, fixed RF/Audio beacons, camera/video acquisition w/computer vision, etc.) to secure applications 375, content (data) and communications functionality of the secure mobile device 300. Thus, access can be governed by geographic location in addition to the biometric identity of the user.

A user space 365 secure partition 350 can be used to host a virtual machine (VM) 370 running a guest operating system (OS). The guest OS can be different than the secure RTOS 340, such as ANDROID OS. The user of the secure mobile device 300 can install various client software applications 375 within the guest OS VM 370.

Multiple guest OS VMs 370 can be instantiated on the secure mobile device 300. The guest OSes can be the same or different. In this situation, each guest OS VM 370 can represent the logical and functional separation of personal client software applications 375 from business or enterprise client software applications 375. This separation can further improve the security for enterprise applications 375 as failures or compromises perpetrated by personal client software applications 375 cannot affect the enterprise client software applications 375.

Further, multiple enterprise guest OS VMs 370 can operate on the secure mobile device 300, representing distinct sets of enterprise client software applications 375. In such a situation, the secure services 355 can apply different security policies to each enterprise guest OS VM 370. That is, one enterprise guest OS VM 370 can be more restricted (have a greater degree of security) than the other. Such an approach can allow for enterprise client software applications 375 that require a greater level of security to operate without over-restricting other applications 375.

In another embodiment, a user space 365 running a guest OS VM 370 can be used to virtualize peripheral device drivers to other guest OS VMs 370 to avoid redundant virtualizations of the peripheral device drivers in multiple user spaces 365.

In essence, the typical user environment experienced when using a smartphone can be virtualized in the user space 365 secure partition 350. When a client software application 375 or the VM 370 needs to interact with the secure RTOS 340, the interaction can be first scrutinized by the appropriate secure services 355. Requested interactions of specific privilege levels can require immediate biometric identity verification of the user via the biometric security service 360. Because the user space 365 is isolated from the secure RTOS 340 and other secure partitions 350, any compromised client software applications 375 used in the user space 365 cannot affect the data and/or processes of the other secure partitions 350 and/or the secure RTOS 340.

Figure 4:
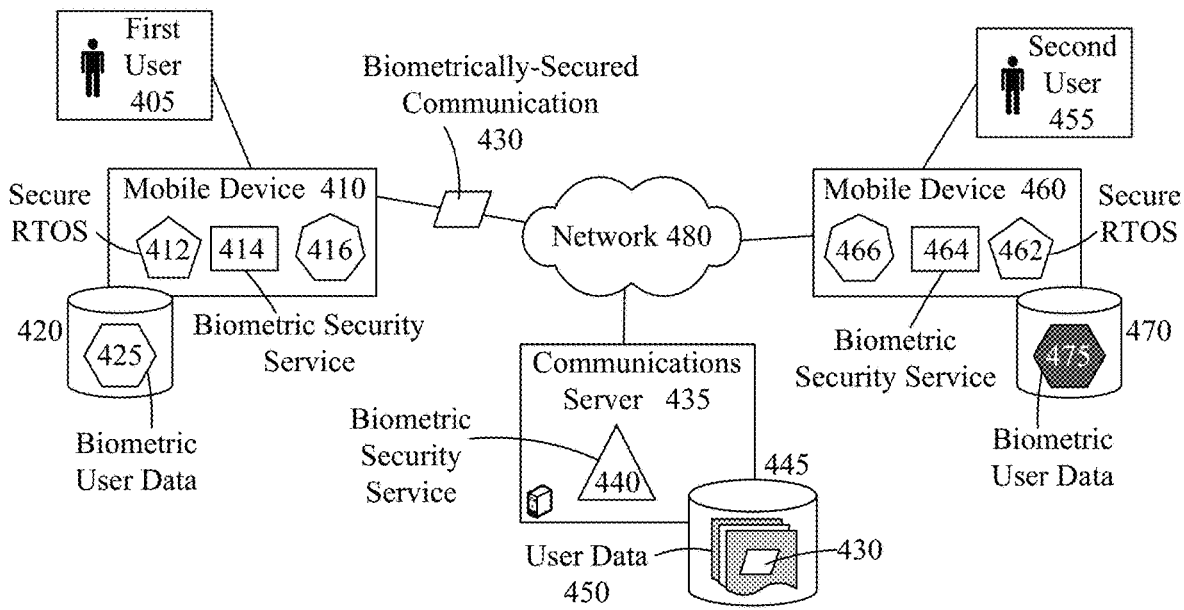
FIG. 4 is a block diagram of a system that utilizes a biometric security service to biometrically-secure a communication sent between secure mobile devices in accordance with embodiments of the inventive arrangements disclosed herein.

FIG. 4 is a block diagram of a system 400 that utilizes a biometric security service 414, 440, and 464 to biometrically-secure a communication 430 sent between secure mobile devices 410 in accordance with embodiments of the inventive arrangements disclosed herein. System 400 can utilize the secure mobile device concepts taught in FIGS. 2 and 3.

In system 400, a biometrically-secured communication 430 can be sent from a first user 405 to a second user 455 using a secure mobile devices 410 and 460. The first and second users 405 and 455 can be human agents interacting with their respective secure mobile devices 410 and 460. The secure mobile devices 410 and 460 can represent specific embodiments of the secure mobile devices 200 and 300 described in FIGS. 2 and 3. As such, the secure mobile devices 410 and 460 can include a secure RTOS 412 and 462, a biometric security service 414 and 464, a communications application 416 and 466, and a data store 420 and 470 that stores biometric user data 425 and 475.

The first user 405 can use the communications application 416 to create the communication 430, which can be a phone call, a voice message, a text message, a video message, or a video call. The first user 405 can be provided with the ability to biometrically-secure the communication 430 using the biometric security service 414.

Biometrically-securing the communication 430 can utilize the applicable hardware components of the secure mobile device 410 as well as functions of the secure RTOS 412. The first user 405 can be required to verify their biometric identity using the biometric security service 412 and their biometric user data 425 in order to enable biometric security.

The biometrically-secured communication 430 can include additional wrapper information defining the parameters required to unlock the communication. This additional information can include, but is not limited to, the name of the recipient 455, the location of the recipient's 455 communication account, the level of biometric verification required, the identifier of the recipient's 455 secure mobile devices 460, and the like.

The secure mobile device 410 can then convey the biometrically-secured communication 430 over the network 480 to the applicable communications server 435. The communications server 435 can represent the hardware and software components necessary to support device-to-device communication functions as is well known in the Art. The communications server 435 can further include a biometric security service 440 to enforce the biometric security of the biometrically-secured communication 430 stored by the communications server 435 in the intended recipient's user data 450 in data store 445.

In another embodiment, the biometric security service 440 can be omitted from the communications server 435. In such an embodiment, the encryption of the biometrically-secured communication 430 and/or the security of the communications server 435 and/or data store 445 can be deemed to be adequate without requiring additional security measures.

The second user 455 can be notified via the communications application 466 that they have received a communication 430. This notification can also indicate that biometric identity verification is required to access the communication 430. The second user 455 can then attempt to access the biometrically-secured communication 430 using the communications application 466. The biometric security service 464 can then be invoked to capture the second user's 455 biometric data to verify their identity against their existing biometric data 475.

Once the second user's 455 biometric identity is verified, the communications server 435 can allow the secure mobile device 460 to present the contents of the biometrically-secured communication 430. Biometric identity verification can be required of the second user 455 every time the access the biometrically-secured communication 430.

As used herein, presented data stores 420, 445, and 470 can be a physical or virtual storage space configured to store digital information. Data stores 420, 445, and 470 can be physically implemented within any type of hardware including, but not limited to, a magnetic disk, an optical disk, a semiconductor memory, a digitally encoded plastic memory, a holographic memory, or any other recording medium. Data stores 420, 445, and 470 can be a stand-alone storage unit as well as a storage unit formed from a plurality of physical devices. Additionally, information can be stored within data store 130 in a variety of manners. For example, information can be stored within a database structure or can be stored within one or more files of a file storage system, where each file may or may not be indexed for information searching purposes. Further, data stores 420, 445, and/or 470 can utilize one or more encryption mechanisms to protect stored information from unauthorized access.

Network 480 can include any hardware/software/and firmware necessary to convey data encoded within carrier waves. Data can be contained within analog or digital signals and conveyed though data or voice channels. Network 480 can include local components and data pathways necessary for communications to be exchanged among computing device components and between integrated device components and peripheral devices. Network 480 can also include network equipment, such as routers, data lines, hubs, and intermediary servers which together form a data network, such as the Internet. Network 480 can also include circuit-based communication components and mobile communication components, such as telephony switches, modems, cellular communication towers, and the like. Network 480 can include line based and/or wireless communication pathways.

Figure 5:
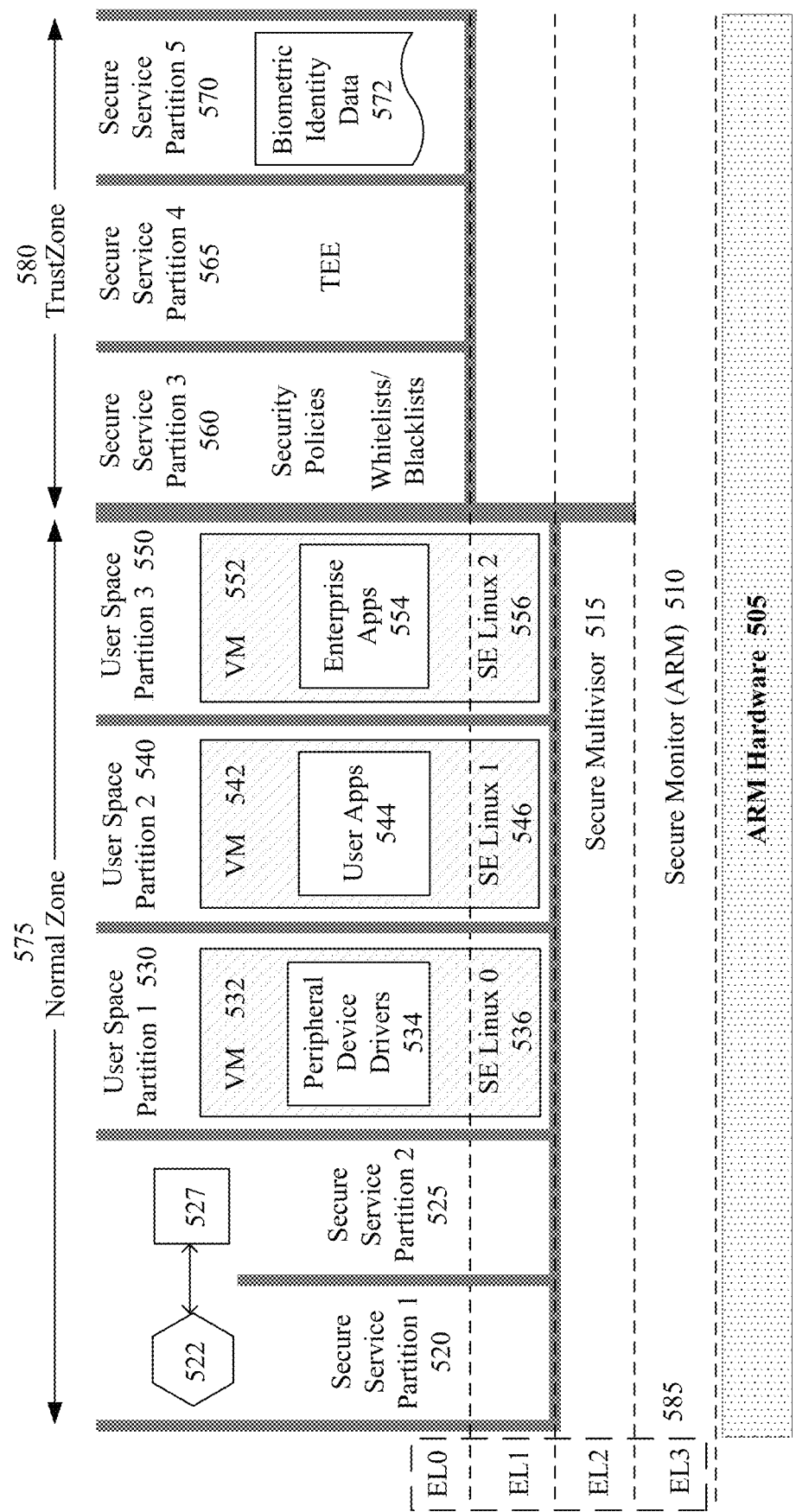
FIG. 5 presents an illustration detailing the secure mobile device security architecture in accordance with embodiments of the inventive arrangements disclosed herein.

FIG. 5 presents an illustration 500 detailing the secure mobile device security architecture in accordance with embodiments of the inventive arrangements disclosed herein. The security architecture depicted in illustration 500 can be utilized within the context of secure mobile devices 200 and 300, system 400, and/or method 600.

The secure mobile device and its secure RTOS can execute upon Advanced RISC Machine (ARM) hardware 505 (e.g., processor, memory, etc.), which is well known in the Art. The vertical layers can correspond to the exception levels 585 utilized by the ARM architecture. These exception levels 585, delineated by horizontal dashed lines, can directly correlate to the level of execution privilege required by the function (hardware, software, and/or firmware); an exception level 585 of EL3 can require the highest level of execution privilege whereas EL0 requires the least.

The secure monitor 510, inherent to the ARM architecture, can operate at EL3 as the secure monitor 510 acts as a gatekeeper between the secure and non-secure states of the processor 505. As is common in the Art, the secure multivisor 515 can operate at EL2 585. EL1 585 can be reserved for privileged functions and operating system kernels 536, 546, and 556, while end-user applications reside at EL0 585.

Illustration 500 can graphically present the segregation (i.e., the thick grey lines) of the secure service partitions 520, 525, 560, 565, and 570 and the user space partitions 530, 540, and 550. The secure multivisor 515 can allocate a set of dedicated hardware 505 resources to each secure partition 520-570 as well as restrict communication between the secure partitions 520-570. For example, the secure multivisor 515 can prevent the user space partitions 530, 540, and 550 from communicating with each other or the secure partitions 520-570.

Horizontally, the secure partitions 520-570 can be separated based on whether they belong to the normal zone 575 or the TRUSTZONE 580. The TRUSTZONE 580 can be specific to the ARM hardware 505 and can be approach a hardware-based security that works in conjunction with the secure monitor 510. The TRUSTZONE 580 can be used to create a Trusted Execution Environment (TEE) in secure service partition 4 565.

As is known in the Art, the TEE can be an isolated execution environment that guarantees the integrity of trusted applications and their associated data assets. The present invention can use the TEE to protect the integrity of the data used by the secure services that are stored secure partitions 560 and 570. This architecture can add an extra level of security that guarantees that the secure services' data cannot be compromised by software applications executed within the secure partitions 520, 525, 530, 540, and 550 of the normal zone 575, which designates all other execution elements that are not part of the TRUSTZONE 580.

However, it may not be as well known in the Art that TRUSTZONE 580 implementation can include a variety of system-level services (i.e., device drivers, controllers, etc.) that can be vulnerable to attack, particularly because the TRUSTZONE 580 can favor guest OS VM 542 and 552 transactions, which are inherently unsecured. As such, malicious software can attempt to capitalize on these hidden vulnerabilities and utilize the TRUSTZONE 580 as an attack surface. The architecture of the present invention can eliminate the TRUSTZONE 580 as a means for infiltration by using the secure services in place of these vulnerable services. Thus, the secure multivisor 515 can be given control of service fulfillment within the TRUSTZONE 580.

Secure service partition 1 520 and secure service partition 2 525 can execute the various secure services; logical and/or functional separation between the secure services can performance as well as add additional security. For example, secure service partition 1 520 can house device-level security-related secure services like a firewall and session manager whereas secure service partition 2 525 can house application-level secure services like intrusion detection and secure storage.

The slightly shorter thick grey line between these two secure service partitions 520 and 525 can indicate that specific direct interactions are allowed between these partitions, such as between the biometric security service 522 and the driver software 527 for the hardware 505 components (e.g., camera) needed to capture the user's biometric data. Further, secure service partition 1 520 can be authorized to request access to the biometric identity data 572 stored in secure service partition 5 570.

Likewise, device and/or application related security services running in secure service partitions 1 and 2 520 and 525 can be allowed to access security data like the security policies and whitelists/blacklists stored in secure service partition 3 560. The security policies and whitelists/blacklists can exist at various levels, such as the device level, user space partition 540 and 550 level, and application 544 and 554 level. This granularity in the application of security policies and whitelists/blacklists can provide an additional level of security that ensures that applications 544 and 554 executing in the user space partitions 540 and 550 are unable to affect each other.

In illustration 500, the user space partitions 530, 540, and 550 can each run an ANDROID VM 532, 542, and 552 having a secure Linux OS kernel 536, 546, and 556. The VM 532 of user space partition 1 530 can be used to run peripheral device drivers 534 that are common to the VMs 542 and 552; this can also help to maintain the integrity of the drivers 534. By instantiating the peripheral device drivers 534 once in user space partition 1 530, the drivers 534 do not need to separately instantiated in each of the other VMs 542 and 552. In an embodiment that only utilizes one VM 542 or 552, virtualizing the peripheral device drivers 534 can be unnecessary.

The VM 542 of user space partition 2 540 can be used to run a variety of user applications 544. VM 542 can represent the user's personal operating environment. The VM 552 of user space partition 3 550 can be used to run various enterprise applications 554. VM 552 can represent the user's business operating environment. This security architecture can allow both of these operating environment to execute simultaneously with a high-level of security for sensitive business data and the assurance that malicious user applications 544 will be unable to compromise the sensitive business data.

The following examples can further illustrate the benefits of proposed security services for use within this security architecture.

A keyboard service and a password management service can be used to prevent password theft within the user space partitions 2 and 3 540 and 550. Any request for username/password data within a user or enterprise application 544 and 554 can be routed to the keyboard service. The keyboard service can render a virtual keyboard and capture the entered username/password data. The captured username/password data can be routed to the password management service.

The password management service can store mappings of username/password data to their respective application 544 and 554. The security architecture can ensure that username/password data is inaccessible by other unauthorized secure partitions 520-570. Additionally, the biometric security service 522 can be invoked to require biometric identity verification to access stored username/password data. This approach can ensure that the username/password data is never resident in memory of the VM 542 and 552 or the secure RTOS, and, therefore, it cannot be RAM or screen scraped by compromised programs or malware.

Figure 6:
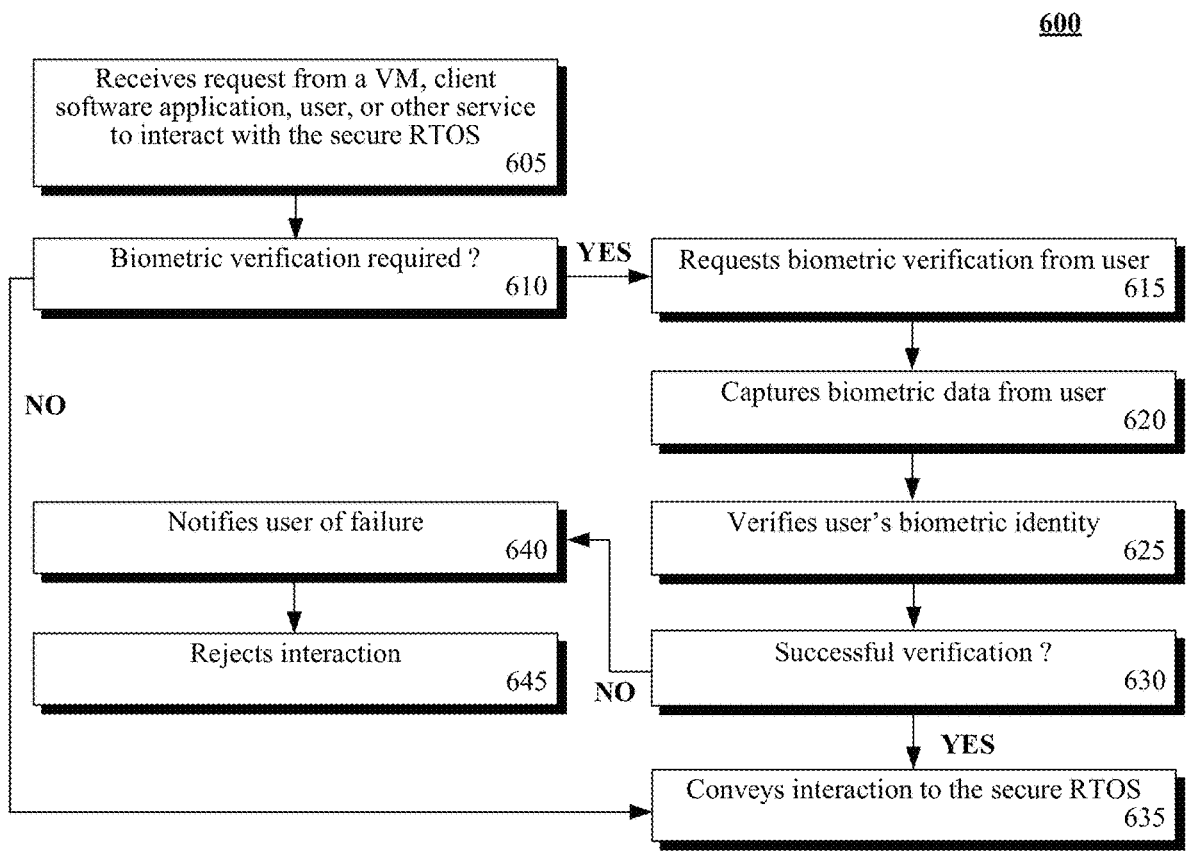
FIG. 6 is a flowchart of a method describing the general operation of the biometric security service in accordance with embodiments of the inventive arrangements disclosed herein.

FIG. 6 is a flowchart of a method 600 describing the general operation of the biometric security service in accordance with embodiments of the inventive arrangements disclosed herein. Method 300 can be performed within the context of secure mobile devices 200 and 300, system 400, and/or illustration 500.

Method 600 can begin with step 605 where the biometric security service can receive a request from a VM, client software application, the user, and/or another service to interact with the secure RTOS of the secure mobile device. It can be determined if biometric verification is required for the interaction in step 610.

In another embodiment, the determination of step 610 can be performed by another secure service and, therefore, omitted from method 600 as only interactions requiring biometric verification will be sent to the biometric security service.

When biometric verification is not required, step 635 can be performed where the interaction is conveyed to the secure RTOS. When biometric verification is required, biometric verification can be requested from the user in step 615. In step 620, the necessary biometric data of the user can be captured.

The biometric identity of the user can be verified in step 625 using the captured biometric data the user's existing biometric identity. In step 630, it can be determined if the user's biometric identity has been successfully verified.

When the user's biometric identity has failed verification, the user can be notified of the failure in step 640. In step 645, the interaction can be rejected. In another embodiment, the user can be allowed a second attempt to verify their biometric identity prior to rejecting the interaction request. In another contemplated embodiment, failure on the part of the user to verify their biometric identity can result in the secure mobile device further restricting the user's privileges and/or access until they successfully verify their identity via a third-party system or other acceptable means.

When the user's biometric identity is successfully verified, step 635 can be performed where the interaction is conveyed to the secure RTOS.

The diagrams in the Figures illustrate the architecture, functionality, and operation of possible implementations of systems and methods according to various embodiments of the present invention. It will also be noted that each block of the block diagrams and combinations of blocks in the block diagrams can be implemented by special purpose hardware-based systems that perform the specified functions or acts, or combinations of special purpose hardware and computer instructions.

What is claimed is:

1. A method for mitigating intrusions to a mobile operating system (OS) comprising:
   instantiating of a plurality of secure services and corresponding data across a plurality of secure service partitions by a secure multivisor running on a mobile device, wherein the mobile device is running a secure real-time operating system (RTOS), wherein each secure service partition is allocated a distinct set of dedicated appropriate hardware resources, wherein the corresponding data is stored in a secure service partition separate from its respective secure service, wherein one of the plurality of secure services is a biometric security service having corresponding biometric data defining a user's identity, wherein the biometric security service has its own secure partition having its own set of dedicated hardware resources;
   instantiating of a user space partition running a virtual machine with a guest OS by the secure multivisor, wherein client software applications are installed and operate from within said virtual machine, wherein the user space partition is allocated a distinct set of dedicated hardware resources;
   when at least one of the virtual machine, a client software application, and a user requests interaction with the secure RTOS that meets a predefined privilege threshold, determining of a biometric identity of the user by the biometric security service;
   when the determined biometric identity of the user matches a required biometric identity of the interaction, allowing of the interaction with the secure RTOS by the biometric security service; and
   when the determined biometric identity of the user fails to match the required biometric identity of the interaction, rejecting of the interaction with the secure RTOS by the biometric security service, wherein potentially-adverse interactions are denied access to the secure RTOS.

2. The method of claim 1, wherein determining the biometric identity of the user further comprises:
   requesting at least one type of biometric data from the user;

capturing the requested at least one type of biometric data using appropriate hardware components of the mobile device; and comparing the captured at least one type of biometric data against the stored biometric data defining the user's identity.

3. The method of claim 1, wherein the mobile device comprises an Advanced RISC Machine (ARM) processor and an established TRUSTZONE, said method further comprising:

modifying code of the mobile device to alter priority of the TRUSTZONE from the guest OS to the secure RTOS to minimize an effectiveness of vulnerability packages targeting the TRUSTZONE through the guest OS.

4. The method of claim 1, wherein the biometric security service utilizes the Biometric Open Protocol Standard (BOPS) as maintained by the Institute of Electrical and Electronics Engineers (IEEE) in IEEE 2410.

5. The method of claim 1, wherein the interaction for which the biometric secure service is triggered per the predefined threshold due to the information being handled being considered sensitive enough to merit secure biometric authentication is one of the other secure services, which operates out of its own secure service partition.

6. The method of claim 1, wherein the biometric security service works in conjunction with location service to ensure access via the interaction is protected by biometric identity and by a geographic location of the mobile device.

7. A mobile device comprising:

a plurality of hardware components that at least includes a processor system, a persistent non-transitory storage medium, input/output (I/O) components, and a transceiver;

a secure real-time operating system (RTOS) for managing system resources represented by the plurality of hardware components;

a secure multivisor configured to provide a virtualization infrastructure comprised of secure service partitions and user space partitions, wherein each partition is allocated a distinct set at dedicated system resources;

a virtual machine running a guest operating system (OS) within a user space partition, wherein client software applications are installed and operate from within said virtual machine;

at least one item of biometric data defining a user's identity stored within a first secure service partition of the secure service partitions; and a biometric security service operating within a second secure service partition of the secure service partitions configured to control interaction with the secure RTOS utilizing the Biometric Open Protocol Standard (BOPS) as maintained by the Institute of Electrical and Electronics Engineers (IEEE) in IEEE 2410 based upon biometric verification of the user's identity using the at least one item of biometric data and applicable hardware components, wherein the biometric security service has its own secure partition having its own set of dedicated hardware resources, wherein said interaction meets a predefined privilege threshold, wherein potentially-adverse interactions are denied access to the secure RTOS even if occurring through one of the other secure service partitions as access to the secure RTOS for defined potentially-adverse interactions are protected by the biometric security service.

8. The mobile device of claim 7, further comprising:

a plurality of secure services operating in the secure service partitions, excluding the first secure service partition, that provide a plurality of security functions; and a plurality of data for the plurality of secure services stored in the secure service partitions, excluding the first secure service partition, wherein the plurality of data is stored in a secure service partition separate from its respective secure service.

9. The mobile device of claim 8, wherein, when the plurality of hardware components include elements that implement a Trusted Execution Environment (TEE), the secure RTOS is further configured to give transactional priority within the TEE to the secure multivisor instead of the virtual machine and the client applications executing therein, wherein security threats inherent to the TEE are inaccessible as the secure multivisor translates requests from the virtual machine to a corresponding secure service or set of secure services, including the biometric security service.

10. The mobile device of claim 7, wherein the at least one item of biometric data comprises a near-infrared (NIR) iris scan, an image of the user's face for facial recognition, a fingerprint/handprint, a DNA profile, and a voice sample for voice recognition.

11. The mobile device of claim 7, wherein the interaction is a real-time communication with a remote device, which is biometrically secured at both ends prior to initiation.

12. The mobile device of claim 7, wherein the mobile device comprises an Advanced RISC Machine (ARM) processor and an established TRUSTZONE, said mobile device further comprising:

code of in a non-transitory storage medium of the mobile device that alters priority of the TRUSTZONE from the guest OS to the secure RTOS to minimize an effectiveness of vulnerability packages targeting the TRUSTZONE through the guest OS.

13. The mobile device of claim 7, further comprising:

a plurality of virtualized driver software for respective peripheral devices operating in a user space partition, wherein said plurality of virtualized driver software is utilized by the virtual machine.

14. The mobile device of claim 7, wherein the biometric security service imposes a biometric lock upon a text-based communication and voice-based communication, which requires all parties to the communication utilize their own biometric.

15. A computer program product comprising a computer readable non-transitory storage medium having computer usable program code embodied therewith, the computer usable program code comprising:

computer usable program code configured to receive a request for interaction with a secure real-time operating system (RTOS) operating on a mobile device, wherein said interaction originates from at least one of a user, a client software application operating from a virtual machine that is running in a user space partition, and a biometric security service running in its own secure partition having its own set of dedicated hardware resources for the biometric security service, which is referred to as a secure service partition, wherein the biometric security service utilizes the Biometric Open Protocol Standard (BOPS) as maintained by the Institute of Electrical and Electronics Engineers (IEEE) in IEEE 2410;

computer usable program code configured to assess a privilege level of the received interaction, wherein said privilege level defines what features of the secure RTOS are accessible and whether biometric verification is required;

computer usable program code configured to, when the assessed privilege level requires biometric verification, determine, via execution of the biometric security service, a biometric identity of the user using previously-stored biometric data defining the user's identity;

computer usable program code configured to, when the determined biometric identity of the user per the biometric security service matches the required biometric identity of the interaction, allow execution of the interaction with the secure RTOS; and computer usable program code configured to, when the determined biometric identity of the user per the biometric security service fans to match the required biometric identity of the interaction, reject execution at the interaction with the secure RTOS, wherein potentially-adverse interactions are denied access to the secure RTOS through use of the biometric security service.

16. The computer program product of claim 15, wherein determining the biometric identity of the user further comprises:

computer usable program code configured to request at least one type of biometric data from the user;

computer usable program code configured to capture the requested at least one type of biometric data using appropriate hardware components; and computer usable program code configured to compare the captured at least one type of biometric data against the stored biometric data defining the user's identity.

17. The computer program product of claim 15, wherein the biometric security service works in conjunction with location service to ensure access via the interaction is protected by biometric identity and by a geographic location of the mobile device.

18. The computer program product of claim 15, wherein the secure RTOS is an INTEGRITY RTOS.

19. The computer program product of claim 15, wherein the biometric data comprises at least one of a near-infrared (NIR) iris scan, an image of the user's face for facial recognition, a fingerprint/handprint, a DNA profile, and a voice sample for voice recognition.

* * * * *